United States Patent Office 3,769,304
Patented Oct. 30, 1973

3,769,304
PREPARATION OF DIANHYDRIDES FROM MALEIC ANHYDRIDE AND A VINYL BENZENE
Gerald M. Saluti, Fairfield, and John Christos Petropoulos, Norwalk, Conn., assignors to American Cyanamid Company, Stamford, Conn.
No Drawing Filed June 1, 1971, Ser. No. 149,059
Int. Cl. C07c 61/28
U.S. Cl. 260—346.6   10 Claims

ABSTRACT OF THE DISCLOSURE

A process is provided for the preparation of certain dianhydrides by bringing into reactive combination in the presence of a polymerization inhibitor, maleic anhydride and a vinyl benzene, such as styrene or ring-substituted lower-alkyl styrene under a non-flammable atmosphere comprising a major amount of inert gases, such as nitrogen or carbon dioxide or mixtures of the same, and a minor amount of oxygen at a temperature ranging from about 30° C. to about 150° C. The process may be conducted in a batchwise or continuous manner.

---

The present invention relates to a process for preparing certain dianhydrides which comprises reacting a vinyl benzene with maleic anhydride in a non-toxic, oxygenated atmosphere. More particularly, the invention relates to a process for preparing certain dianhydrides which comprises reacting in a non-toxic, non-flammable oxygenated atmosphere comprising a major amount of from 99% to 95% of nitrogen or carbon dioxide or mixtures of such inert gases and a minor amount of oxygen of from 1% to about not more than 5% of oxygen, a vinyl benzene with maleic anhydride at temperatures ranging from about 30° C. to about 150° C.

It is known that dianhydrides prepared from maleic anhydride and certain vinyl benzenes can be prepared. In one method, for instance, enhanced yields of dianhydride are attained by carrying out the process in the presence of a nitric oxide atmosphere as disclosed and claimed in United States Letters Pat. No. 3,410,876 issued to R. R. Di Leone, which is incorporated herein by reference. However, the process is not entirely satisfactory, since the use of nitric oxide requires careful process precautions which obviously increase the cost of preparing the desired product. Nitric oxide gas is toxic and must be confined to the immediate reaction environment. Harm to personnel occurs if any of the gas escapes. Accordingly, special reaction equipment is required. If a process could be developed which avoids the use of nitric oxide, such a process would meet a long-felt need in the art.

It is, therefore, a principal object of the invention to provide a non-toxic, non-flammable process for preparing dianhydrides in good yields by reacting maleic anhydride and a vinyl benzene. It is a further object to prepare dianhydrides from maleic anhydride and a vinyl benzene in the presence of a nontoxic environment comprising nitrogen or carbon dioxide and an oxygen containing gas. Other objects and advantages will become apparent from a consideration of the ensuing description.

To these ends, it has been found that dianhydrides may be prepared in a straightforward manner absent a toxic environment. Maleic anhydride is reacted with a vinyl benzene compound under a non-flammable, non-toxic oxygenated atmosphere within a wide range of temperatures ranging from between about 30° C. and 150° C., and preferably, from about 50° C. to about 120° C. In practice, the maleic anhydride can be initially heated at a temperature sufficiently high to provide molten maleic anhydride through which an oxygenated gas is bubbled. This gas comprises a mixture of from 95% to 99% carbon dioxide, nitrogen or mixtures of the same, and from 1% to 5% oxygen. The vinyl benzene compound, slowly added, reacts with maleic anhydride advantageously in the presence of an hydroquinone inhibitor to avoid copolymerization as between the maleic anhydride and vinyl benzene reactants. The desired dianhydride precipitates out of the solution. Precipitation continues and solid is removed from the reactor until substantially all the dianhydride is produced by the process of the invention.

Advantageously, the non-flammable, non-toxic oxygenated atmosphere comprises a blanket of gases of which 95% to 99% is nitrogen or carbon dioxide and the remainder is oxygen. Alternatively, air may be used in lieu of oxygen. In that event, the rate of air introduction or intake is adjusted, whereby not more than 1% to 5% of oxygen is present. However, for best operation, an adjuvant comprising an hydroquinone polymerization inhibitor should be present in amounts ranging from about 0.02% to 3.0%, based on the weight of the overall reactants present.

Exemplary of the aforementioned gas mixtures are mixtures of (a) 20% air and 80% nitrogen which is equivalent to about 4% oxygen and 96% nitrogen, (b) 20% air and 80% carbon dioxide which is equivalent to about 5% oxygen, 15% nitrogen, and 80% carbon dioxide, (c) 25% air and 75% nitrogen which is equivalent to about 5% oxygen and 95% nitrogen and (d) 4% oxygen and 96% carbon dioxide. The gases are, in general, introduced at a rate equivalent to 0.05 liter to 1 liter per minute, and preferably, from about 0.5 liter to 0.8 liter per minute.

Insofar as the hydroquinone inhibitor is concerned, any hydroquinone including hydroquinone, tolyl hydroquinone, ethyl hydroquinone, isopropyl hydroquinone, or di-t-butyl hydroquinone and equivalents of the same, can be effectively employed.

Although the overall process has been described as a batchwise operation, it is within the purview of the invention to adapt the same to a continuous operation as will be exemplified hereinbelow. Thus, two mols of maleic anhydride can react theoretically with one mol of the vinyl benzene compound. To obtain the best yields of the dianhydride based on the amount of the vinyl benzene material present in the reaction mixture, one would use at least two mols of the maleic anhydride for each mol of the vinyl benzene material, or even about a 10%–20% (ten–twenty percent) excess over and beyond the stoichiometric amount of maleic anhydride calculated to completely react with the vinyl benzene material. However, it may be desirable to form a reaction mixture in which the vinyl benzene material is present in stoichiometric excess and is thus capable of acting as a solvent and a precipitation medium. An excess of the vinyl benzene material is particularly desirable when the process is carried out at the lower temperatures, i.e., below the melting point of the maleic anhydride, in which case it acts as a solvent for the maleic anhydride and also as a medium from which the desired dianhydride product can be precipitated.

The process of forming dianhydrides in accordance with the present invention involves an adduct type of reaction following a classical Diels-Alder type reaction. Since the vinyl benzene material is susceptible of homopolymerization as well as copolymerization with maleic anhydride at elevated temperatures, the oxygenated gas environment and an hydroquinone which are used in accordance with the present invention is believed to serve the function of inhibiting the tendency toward polymer formation, and may for that reason be classified in this instance as a polymerization inhibitor. Unexpectedly, the oxygenated gas mixture in the presence of an hydroquinone has been found to be an effective inhibitor against polymerization, since the end products resulting from the reaction between the maleic anhydride and the vinyl benzene material are found to be substantially free of polymeric material.

The process of the present invention can be carried out without the benefit of any inert solvent material and, preferably, the earlier stages of the reaction are carried out in the absence of any solvent. However, as the dianhydride is produced and is precipitated out of solution in the vinyl benzene solvent, it is desirable to add a small quantity of an inert organic solvent to the reaction environment in order to form a slurry of the dianhydride in the inert solvent, thereby permitting substantially complete interaction between the maleic anhydride and the vinyl benzene compound for maximum yield. Among the inert organic solvents which may be used in the process of the present invention are: benzene, toluene, xylene or the aliphatic hydrocarbon solvents, such as hexane, heptane, octane, and the like. The dianhydrides produced according to the process of the present invention are substantially insoluble in these inert organic solvents and will precipitate therefrom, thus making it a relatively simple matter to isolate the precipitate from the suspension medium by filtration or other mechanical separating means.

As employed herein, the term "vinyl benzene" encompasses aromatic compounds with one or two vinyl groups and up to one alkyl group having one to seven carbon atoms. Exemplary of such compounds are: styrene, o-, m-, or p-butyl styrene, and o-, m-, or p-divinyl benzene. The term "vinyl benzene" is intended to cover pure compounds as well as isomeric mixtures such as o-, m-, and p-vinyl toluene or o-, m-, and p-divinyl benzene. In fact, in many cases, the vinyl benzene material is commercially available as an isomeric mixture and such mixtures are eminently suitable for use in the process of the present invention.

Dianhydrides which result from the reaction of one mol of maleic anhydride with two mols of a vinyl benzene material in accordance with this invention are identified as follows:

(A) Using styrene in the reaction with maleic anhydride yields 3,4-dicarboxy-1,2,3,4-tetrahydro-1-naphthalenesuccinic dianhydride.

(B) Using a lower-alkyl vinyl benzene in the reaction with maleic anhydride yields the corresponding 5-, 6-, 7-, or 8-lower alkyd 3,4-dicarboxy-1,2,3,4-tetrahydro-1-naphthalenesuccinic dianhydride. If the alkyl vinyl benzene starting material is a mixture of isomers, then the dianhydride product will correspondingly be a mixture of isomeric dianhydrides. As examples of dianhydrides in this category, there can be named 3,4-dicarboxy-1,2,3,4-tetrahydro-6- (and 7-)-methyl-1-naphthalenesuccinic dianhydride and 3,4-dicarboxy-1,2,3,4-tetrahydro-6- (and 7-)-butyl-1-naphthalenesuccinic dianhydride.

(C) Using a divinyl benzene such as m-divinyl benzene either in pure form or admixed with p-divinyl benzene and/or o-divinyl benzene in the reaction with maleic anhydride, there is obtained a dianhydride based upon phenanthrene, i.e., the compound 3,4,7,8-tetracarboxy-1,2,3,4,5,6,7,8-octahydrophenanthrene 3,4; 7,8-dianhydride.

The phenanthrene dianhydride described in the immediately preceding paragraph can be used as a curing agent for synthetic resins as well as an intermediate in the preparation of other useful compounds, particularly resin-forming monomeric materials. Thus, the phenanthrene dianhydride can be reacted with monoamines to give monomeric monoimide or diimide products which are useful as building blocks for polymer formation, as curing agents, as plasticizers, and as synthetic lubricants.

The dianhydrides resulting from the reaction of styrene or alkyl vinyl benzenes can be used in the same manner as the above-described phenanthrene dianhydride to form imide derivatives. Such imides are useful in the same manner as the imides formed from phenanthrene dianhydride, since they are tough, hard, fusible materials.

In addition to the foregoing uses for the dianhydrides prepared in accordance with the present invention, they may also be converted to ester derivatives by reaction with either monohydric or dihydric alcohols. The reaction with a monohydric alcohol (e.g., methanol, ethanol, propanol, allyl alcohol, etc.) produces monomeric ester materials which can be used as plasticizing agents for polyvinyl chloride and polyvinylidene chloride compositions in the place of conventional dialkyl phthalate plasticizers. The reaction with polyhydric alcohols, such as monomeric alkylene glycols and polymeric alkylene glycols, yields polyesters which are capable of forming films which are hard, tough, and solvent resistant, and thus are useful as coating and molding compositions.

The compound 3,4 - dicarboxy-1,2,3,4-tetrahydro-1--naphthalenesuccinic dianhydride will be referred to hereinbelow sometimes as either Tetralin dianhydride or "TDA."

The following examples are presented to illustrate the present invention with greater particularity. They are not intended as being limitative. Unless otherwise specified, all parts and percentages are by weight.

EXAMPLE 1

Into a suitable reaction vessel equipped with stirrer, thermometer, reflux condenser, two gas inlets, outlet tubes, and stainless steel baffles are charged 392 parts of maleic anhydride, 50 parts of benzene, and 3.25 parts of tolylhydroquinone. Air is passed through the tube at 0.3 liter per minute and nitrogen gas passed through one inlet at a rate of 1.2 liters per minute. The solution is heated to a temperature of 115° C. and 208 parts of styrene are pumped through the second inlet of the cold finger at a rate of 2 milliliters per minute. Addition of styrene is complete within two hours and crystallization of Tetralin dianhydride occurs after 2½ hours. The solution is maintained at 115° C. for a total of six hours. Thereafter, 300 parts (by volume) of benzene are added and the slurry cooled to room temperature and filtered.

The yield of Tetralin dianhydride is found to be 63%, having a melting point equal to 194° C. to 202° C. Analysis of the overall filtrate by gas chromatography shows that 28% of unreacted maleic anhydride and styrene remain.

EXAMPLES 2–6

The ensuing examples illustrate a continuous operation which was carried out for a total of five cycles to obtain a dianhydride in each cycle.

A suitable resin flask was equipped with baffles and a two-blade mechanical stirrer. Two purging tubes were attached, one for air which extended to the very bottom of the flask, and one for nitrogen which extended to a position above the liquid level in the flask. A cold finger containing a hollow center was attached and extended below the liquid level of the flask for pumping in styrene during the reaction. Also attached to the reactor system were a thermometer for monitoring temperature and a reflux condenser. During the reaction, air was pumped through the liquid at a rate of 0.2 liter per minute and nitrogen was passed above the liquid at a rate of 0.8 liter per minute.

As indicated below in tubularized form, appropriate amounts of maleic anhydride and tolylhydroquinone were charged to the reactor and heated to the reaction temperature. An appropriate amount of styrene was next pumped into the reactor through the cold finger over a three-hour period. The reaction was then either stopped or extended for the desired duration and the mixture cooled to 75° C. The slurry obtained was filtered at 75° C. and the Tetralin dianhydride (TDA) filter cake washed with benzene. The benzene wash and reaction mother liquor were combined and weighed, and unreacted styrene and maleic anhydride present were determined quantitatively by vapor phase chromatography. This solution was recharged to the reactor and fresh maleic anhydride and tolylhydroquinone were added and the mixture heated to the reaction temperature. A new cycle was then started by pumping in fresh styrene.

The wet TDA filter cake was weighed before the first benzene wash, then it was washed five times with benzene to remove all traces of mother liquor, dried thoroughly, and weighed again. The difference in weight between cake wet with mother liquor and dried TDA gave the amount of mother liquor and, therefore, unreacted maleic anhydride and styrene lost for a cycle.

The above-described procedure was repeated for four recycles. The yields were noted for each cycle and, finally, a total overall yield for the process was obtained.

Example 2

The continuous operation procedure above is followed in every detail, noting the following:

Reaction details

| | |
|---|---|
| Maleic anhydride (MA) charged | parts__ 784 |
| Styrene charged | do____ 624 |
| Tolylhydroquinone (THQ) charged | do____ 18 |
| Styrene addition time | hours__ 3 |
| Reaction time | do____ 3 |
| Reaction temperature | ° C__ 112–115 |

Recovery details

Dried TDA (M.P. 194°–202° C.) is obtained: 552 parts or 46.0% yield.

| | Parts |
|---|---|
| MA unreacted | 275 |
| Styrene unreacted | 300 |
| MA recycled | 208 |
| Styrene recycled | 226 |

25% lost in filter cake.

Example 3

This example illustrates the first cycle following the above continuous operation procedure:

Reaction details

| | |
|---|---|
| THQ charged | parts__ 18 |
| MA charged | do____ 576 |
| Styrene charged | do____ 400 |
| Addition time | hours__ 3 |
| Reaction time | do____ 3 |
| Reaction temperature | ° C__ 105–110 |

Recovery details

Dried TDA (M.P. 196°–203° C.) is obtained: 350 parts or 29.2% yield of which:

| | Parts |
|---|---|
| MA unreacted | 351 |
| Styrene unreacted | 346 |
| MA recycled | 288 |
| Styrene recycled | 284 |

18% lost in filter cake.

Example 4

This example illustrates the second cycle following Example 3.

Reaction details

| | |
|---|---|
| MA charged | parts__ 496 |
| Styrene charged | do____ 340 |
| THQ charged | do____ 18 |
| Addition time | hours__ 3 |
| Reaction time | do____ 5 |
| Reaction temperature | ° C__ 100–105 |

Recovery details

Dried TDA (M.P. 190°–195° C.) is obtained: 650 parts or 54.2% yield.

| | Parts |
|---|---|
| MA unreacted | 297 |
| Styrene unreacted | 290 |
| MA recycled | 220 |
| Styrene recycled | 215 |

26% lost in filter cake.

Example 5

This example illustrates the third cycle following Example 4.

Reaction details

| | |
|---|---|
| MA charged | parts__ 574 |
| Styrene charged | do____ 420 |
| THQ charged | do____ 18 |
| Addition time | hours__ 3 |
| Reaction time | do____ 4½ |
| Reaction temperature | ° C__ 105–110 |

Recovery details

Dried TDA (M.P. 190°–196° C.) is obtained: 640 parts or 53.3% yield.

| | Parts |
|---|---|
| MA unreacted | 252 |
| Styrene unreacted | 283 |
| MA recycled | 209 |
| Styrene recycled | 236 |

26% lost in filter cake.

Example 6

This example illustrates the fourth cycle following Example 5.

Reaction details

| | |
|---|---|
| MA charged | parts__ 575 |
| Styrene charged | do____ 388 |

No THQ added.

| | |
|---|---|
| Addition time | hours__ 3 |
| Reaction time | do____ 4½ |
| Reaction temperature | ° C__ 107–110 |

Recovery details

Dried TDA (M.P. 190°–195° C.) is obtained: 700 parts or 58.3% yield.

Additional TDA (M.P. 180°–190° C.) is recovered from mother liquor: 200 parts.

| | Parts |
|---|---|
| MA unreacted | 193 |
| Styrene unreacted | 249 |

It has been found that the overall yield of TDA resulting from the runs carried out in Examples 2 to 6 is 79.5%, calculated on the basis of the total charge of maleic anhydride.

We claim:

1. In a process for the preparation of dianhydrides which comprises bringing into reactive combination at a temperature between about 30° C. and 150° C., maleic anhydride and a vinyl benzene compound, the improvement which comprises: conducting the reaction under a non-flammable, non-toxic atmosphere consisting of from 95% to 99% nitrogen or carbon dioxide and from 1% to 5% of oxygen in the presence of an hydroquinone adjuvant ranging from about 0.02% to about 3.0%, based on the weight of the said reactants.

2. The process of claim 1 wherein the vinyl benzene material is styrene and the dianhydride product is 3,4-dicarboxy - 1,2,3,4 - tetrahydro - 1 - naphthalenesuccinic dianhydride.

3. The process of claim 1 wherein the vinyl benzene material is vinyl toluene and the dianhydride product is a mixture of 3,4-dicarboxyl-1,2,3,4-tetrahydro-6 (and 7-)-methyl-1-naphthalenesuccinic dianhydride.

4. The process of claim 1 wherein the vinyl benzene material is meta-divinyl benzene and the dianhydride product is 3,4,7,8-tetracarboxy-1,2,3,4,5,6,7,8-octahydrophenanthrene 3,4; 7,8-dianhydride.

5. The process of claim 1 wherein excess vinyl benzene material is present in the reaction mixture, thus to serve as a reaction solvent and a precipitation medium for the product dianhydride.

6. The process of claim 1 wherein the reaction is carried out in a continuous manner.

7. The process of claim 1 wherein the nitrogen/oxygen mixture consists of 96% nitrogen and 4% oxygen.

8. The process of claim 1 wherein the nitrogen/oxygen mixture consists of 25% air and 75% nitrogen.

9. The process of claim 1 wherein the hydroquinone adjuvant is hydroquinone.

10. The process of claim 1 wherein the hydroquinone adjuvant is tolylhydroquinone.

References Cited

UNITED STATES PATENTS 3,410,876   11/1968   Di Leone _____ 260—346.6

OTHER REFERENCES

Alder et al., Liebigs Annalen der Chemie, vol. 595, pp. 1–9 and 22–27 (1955).

ALEX MAZEL, Primary Examiner

B. DENTZ, Assistant Examiner